United States Patent Office 3,187,021
Patented June 1, 1965

3,187,021
DIBENZANTHRONE AND ISODIBENZANTHRONE HAVING SULFATOXYALKYL SULFONAMIDE GROUPS
Kurt Weber, Basel, Switzerland, assignor to Ciba Limited, Basel, Switzerland, a company of Switzerland
No Drawing. Filed Oct. 10, 1961, Ser. No. 144,051
Claims priority, application Switzerland, Oct. 14, 1960, 11,525/60
2 Claims. (Cl. 260—354)

The present invention provides new vat dyestuffs which contain at least one group of the formula (1) 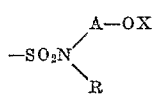

in which A represents an aliphatic radical, advantageously an alkyl radical, in which the group —OX is preferably in the β-position with respect to the nitrogen atom, R represents an alkyl group or a radical of the formula —AOX and X represents an inorganic acyl radical imparting solubility in water, especially a sulfuric acid radical.

The term "vat dyestuffs" is used herein to denote dyestuffs which are convertible by reduction into a so-called leuco form or vat which has a better affinity for natural or regenerated cellulose fibers than the unreduced form and in which the original chromophoric system can be restored by oxidation. As suitable vat dyestuffs there may be mentioned especially those of the anthraquinone series, for example, those which contain an unchanged 9:10-dioxoanthracene ring, and also anthraquinones which also contain fused carbocyclic rings or consist of a plurality of anthraquinone units, and also vat dyestuffs of the perylene tetracarboxylic acid diimide series, the naphthalene tetracarboxylic acid series, the pyrenequinone- or naptho-quinone series and indigoid vat dyestuffs. In addition to at least one hydroxyl group esterified by an inorganic acyl radical, the dyestuffs may contain the substituents usual in vat dyestuffs, such, for example, as halogen atoms or alkoxy, acylamino or arylamino groups. The dyestuffs of the invention are, however, preferably free from nitro or unprotected amino groups. As protected amino groups there may be mentioned those which are in peri-position to a keto group in the anthraquinone ring and which have in ortho-position thereto a carbonyl group or a functionally converted carboxylic acid group, for example, a carboxylic acid ester group or cyano group. As examples of vat dyestuffs which are to contain at least one group of the Formula 1, there may be mentioned: dibenzanthrone, isodibenzanthrone, anthanthrone, dibenzopyrene-quinone, pyranthrone, flavanthrone, indanthrone, acedianthrone, N:N'-diethyldipyrazole-anthronyl, anthraquinone-2:1(N)-1':2'(N)naphthacridone, 1:1'-dianthrimidecarbazole, 2':2''-diphenyl - anthraquinone - 1:2(N)- 5:7(N)-dithiazole, 1:4-1:5- or 1:8-dibenzoylaminoanthraquinone, acylamino-anthraquinones which are obtained by the condensation of two molecular proportions of an α-aminoanthraquinone, for example, 1-aminoanthraquinone, 1-amino-4- or 1-amino-5-benzoylaminoanthraquinone or aminodibenzanthrone, with a benzene dicarboxylic acid chloride or a di- or trichlorotriazine. In addition to the aforesaid dyestuffs of the anthraquinone series, there may be mentioned as representatives of the indigoid vat dyestuffs, indigo or thioindigo and their substitution products and vat dyestuffs of the perylene-tetra-carboxylic acid series or naphthalene tetracarboxylic acid series or pyrenequinone series, or naphtho-quinone series.

The invention also provides a process for the manufacture of the above new dyestuffs, wherein (a) a vat dyestuff containing at least one radical of the formula

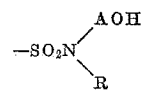

is treated with an agent capable of introducing an inorganic acyl radical imparting solubility in water, or (b) a vat dyestuff containing at least one sulfonic acid halide group is condensed with an amine of the formula

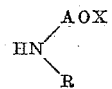

in which R, A and X have the meanings given above.

As starting materials for method (a) there are preferably used vat dyestuffs containing one or two groups of the formula (2) 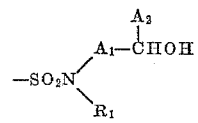

in which $A_1$ represents an alkylene radical, preferably a methylene radical, $A_2$ represents a hydrogen atom or an alkyl or hydroxyalkyl radical, preferably containing 1 to 6 carbon atoms, and $R_1$ represents an alkyl radical or a radical of the formula

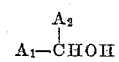

The following groups may be mentioned as examples of radicals of Formula 2:

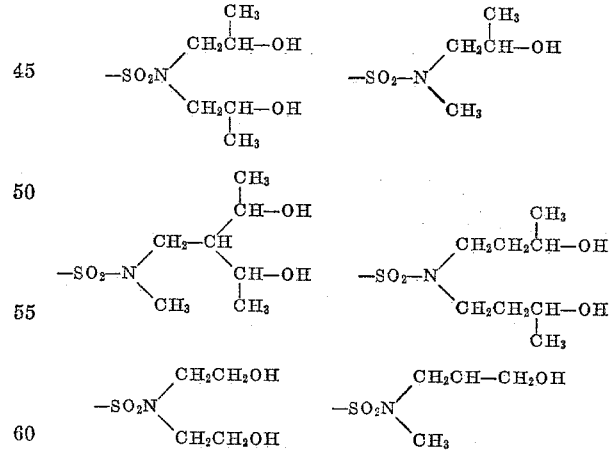

These can be obtained by reacting the sulfonic acid chlorides of vat dyestuffs with the appropriate hydroxyalkyl amines.

The said sulfonic acid hydroxyalkyl amides are treated with agents which are capable of introducing an inorganic acyl radical producing water-solubility, for example, a phosphoric acid radical, but more especially a sulfuric acid radical. To this end, the hydroxyalkyl sulfonamides are preferably reacted with concentrated sulfuric acid, it being advantageous to use at least 3 parts of sulfuric acid to 1 part of dyestuff.

The sulfating process may also be carried out with oleum or chlorosulfonic acid or addition compounds thereof with tertiary bases or amides, for instance, pyridine, triethylamine or dimethyl formamide.

As starting materials for embodiment (b) of the process according to the invention there are preferably employed vat dyestuffs containing one or two sulfonic acid halide groups, in particular sulfonic acid chloride groups. These can be obtained by treating vat dyestuffs with chlorosulfonic acid or by reacting vat dyestuffs containing sulfonic acid groups with acid halogenating agents, for example, phosphorus halides, thionyl chloride or chlorosulfonic acid, by known methods.

Another method of obtaining the sulfochlorides serving as starting materials comprises acylating vat dyestuffs containing amino groups, especially aminoanthraquinones, with benzoic acid sulfonic acid dichloride, to produce a chlorosulfonyl-benzoylaminoanthraquinone.

The reaction of the said sulfochlorides with the amine of the formula (3)   

can be carried out in an inert organic solvent, for instance nitrobenzene, chlorobenzene or ortho-dichlorobenzene, at elevated temperature. However, as the sulfochlorides are generally obtained in aqueous suspension when worked up, it has proved to be advantageous to carry out the reaction with the amine of Formula 3 in an aqueous medium, advantageously in the presence of acid-binding agents, such as for example, sodium acetate, sodium hydroxide or sodium carbonate. It is advantageous to choose the molar ratios of the constituents in such manner that at least one mol of an amine of Formula 3 is used for one sulfochloride group of the vat dyestuff.

The dyestuffs so obtained can be isolated from the reaction mixture, and, despite the presence of the readily saponifiable grouping of Formula 1, can be worked up into suitable dry dyeing preparations. Isolation is preferably effected by filtering. The filtered dyestuffs may be dried, if required, after adding extenders having a neutral or weakly alkaline reaction; preferably, the drying is effected at not too high temperatures, if required under reduced pressure.

The new dyestuffs are suitable for dyeing the most diverse materials, but more particularly for dyeing or printing on textile materials made of natural or regenerated cellulose by the conventional vat dyeing and printing processes. The colors and prints obtained thereby are distinguished by excellent light fastness and fastness to wetting.

The dyestuffs prepared according to the invention can as a rule be vatted preparatory to dyeing very easily, often at room temperature, even with mild reducing agents such as glucose or sodium sulphide. They have very good solubility in the vat and excellent levelling and penetrating properties. Especially on regenerated cellulose, strong and very even colorings are obtained which are of the same shade as the corresponding colorings obtained in cotton.

As the splitting capacity of the acylated hydroxyl groups in the sulfonic acid alkyl amide radical may be somewhat different from one case to the other, it is advantageous to adapt the method of dyeing, that is, especially the concentration of the alkali and of the reducing agent, and also the duration and the temperature during the dyeing or steaming to the dyestuff. The most favourable conditions can easily be ascertained by means of preliminary tests.

The following examples, illustrate the invention; the parts, unless otherwise indicated, are parts by weight, the percentages are by weight, and the temperatures are in degrees centigrade.

*Example 1*

4 parts of the dyestuff of the formula

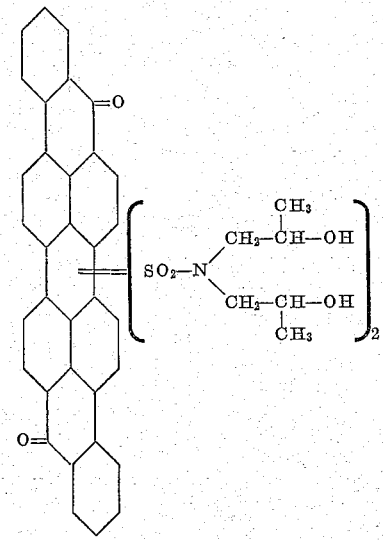

were added at 0° to 5° C. to 80 parts of concentrated sulfuric acid and dissolved. The solution was carefully poured on to 1000 parts of ice and water and the violet precipitate was filtered off, dissolved in 1000 parts of water at 50° C. and exactly neutralized with caustic soda solution. After adding 50 parts of common salt, filtering was carried out and then drying in vacuo at 60° to 70° C.

The new dyestuff corresponds as free acid to the formula

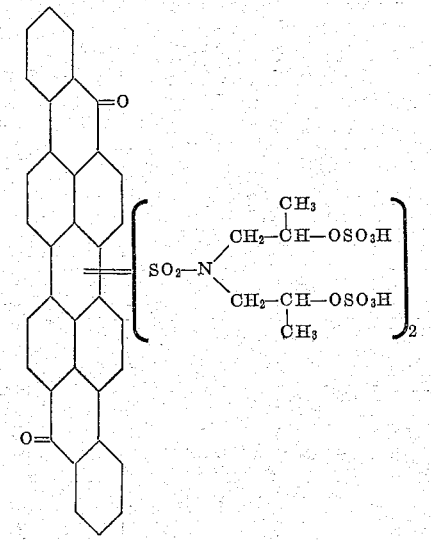

and was well soluble in water, giving a blue-violet color. It could be used for dyeing as follows:

0.15 part of the dyestuff was dissolved in 50 parts of water at 70° C. The solution was poured into a warm solution (70° C.) of 6 parts by volume of caustic soda solution having a specific gravity of 36° Bé. and 1.2 parts of sodium hydrosulfite in 350 parts of water, 10 parts of cotton were immediately introduced and dyeing was carried out for 45 minutes at 70 to 80° C. with the addition of 12 parts of sodium chloride. After dyeing, the cotton was rinsed in cold running water until complete oxidation was obtained and then soaped while boiling. A strong, reddish blue color having good fastness properties was obtained.

The dyestuff of the Formula 1 can be obtained as follows:

11.4 parts of isodibenzanthrone are added at 20 to 25°

C. while stirring to 210 parts of chlorosulfonic acid and dissolved. The solution is then heated for 2 hours to 80 to 85° C., cooled to room temperature and carefully poured on to ice. The precipitated sulfochloride is filtered off, washed with a little ice water and suspended in 500 parts of ice water. 200 parts of diisopropanolamine are added at 0 to 5° C. and the mixture is stirred for 2 hours at 0 to 5° C., for 20 hours at room temperature and for 2 hours at 60 to 70° C. The precipitate is then filtered off in the warm state, washed neutral with hot water and dried.

*Example 2*

5 parts of the dyestuff of the formula

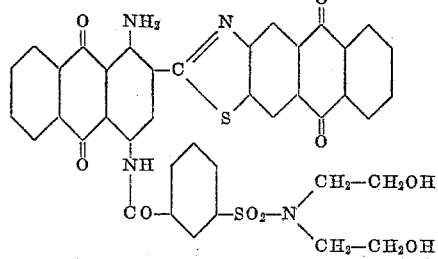

(3)

were added at 0–5° C. to 80 parts of sulfuric acid of 96% strength and stirred for 4 hours at this temperature. Working up was carried out as indicated in Example 1.

The new dyestuff corresponds as free acid to the formula

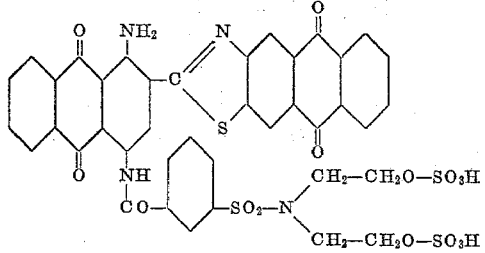

It can be used for dyeing as follows:

0.2 part of the dyestuff was suspended in 50 parts of hot water. This suspension was poured into a warm solution (50° C.) of 2 parts by volume of sodium hydroxide solution of 30% strength and 1.2 parts of sodium hydrosulphite in 350 parts of water, vatting occurring instantaneously. 10 parts of cotton were introduced immediately and dyeing was carried out for 45 minutes at 40–50° C. with the addition of 12 parts of sodium chloride. The dyeing was followed by oxidation, washing, acidification, good rinsing and soaping while boiling. A greenish blue color having excellent fastness properties was obtained.

The dyestuff of the Formula 3 can be obtained by condensation of the corresponding sulfochloride with diethanolamine in nitrobenzene at 120° C.

Instead of the dyestuff of Formula 3, it is possible to employ as starting material compounds containing the radicals of the following hydroxyalkyl amines instead of the diethanolamine radical:

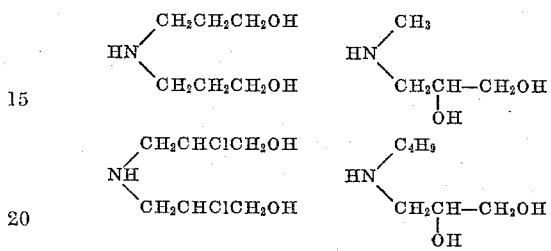

*Example 3*

The dyestuff of the formula

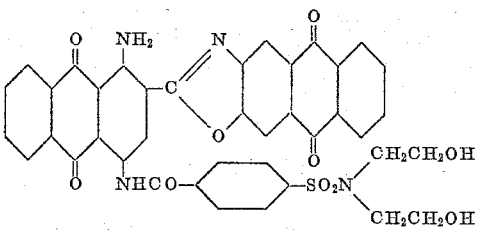

was used as starting material and the procedure indicated in Example 2 was followed in other respects. The corresponding disulfuric acid ester was likewise obtained and, by the method indicated in Example 2, paragraph 2, likewise dyed, cotton in blue shades having excellent fastness properties.

*Example 4*

The dyestuff of the formula

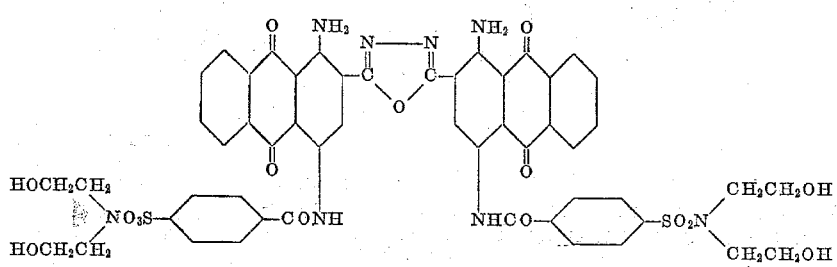

was employed as starting material and the same procedure as that indicated in Example 2 was otherwise followed. The tetrasulfuric acid ester was obtained, which, by the dyeing process indicated in Example 2, paragraph 2, dyed cotton in reddish blue shades.

*Example 6*

3 parts of the dyestuff of the formula

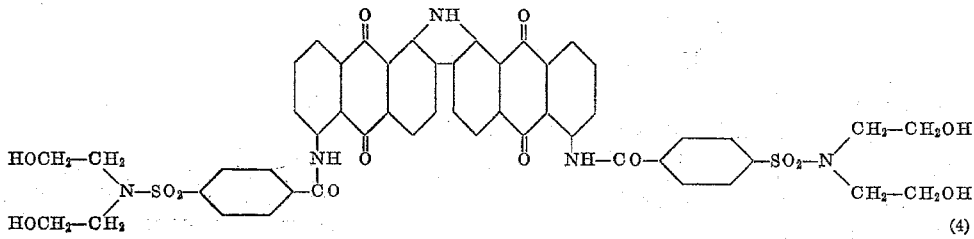

(4)

were added at 0–5° C. to 50 parts of concentrated sulfuric acid and stirred for 5 hours at this temperature. Working up was carried out as described in Example 1.

The new dyestuff corresponds as free acid to the formula

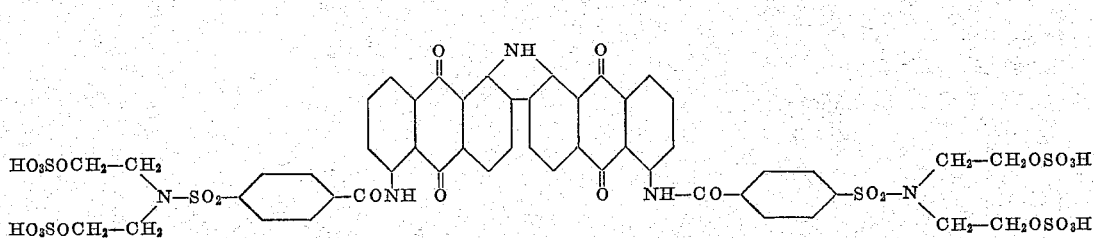

Golden yellow shades having excellent fastness properties were obtained with this dyestuff by the dyeing process described in Example 2.

*Example 6*

5 parts of the dyestuff of the formula

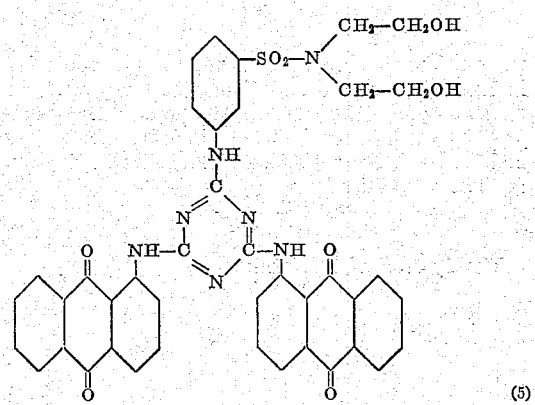

were added at 15–20° C. to 80 parts of sulfuric acid of 96% strength and stirred for 5 hours at room temperature. Working up was carried out as described in Example 1.

The new dyestuff corresponds as free acid to the formula

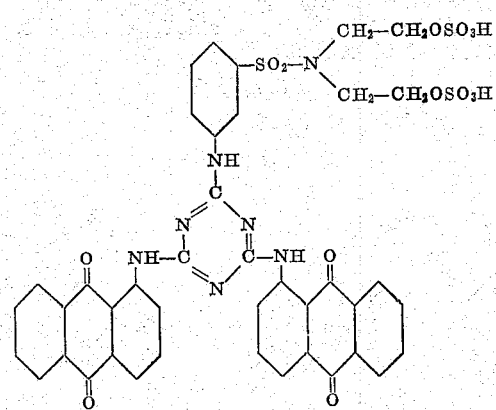

and was soluble in water, giving a yellow color. Yellow shades having excellent fastness properties were obtained with this dyestuff by the dyeing process described in Example 2.

The dyestuff of the Formula 5 can be obtained by condensation of the condensation product of 2 mols of 1-aminoanthraquinone and 1 mol of cyanuric chloride with 1 - aminobenzene-3-(-N,N-di-β-hydroxyethyl) - sulfonamide in nitrobenzene.

*Example 7*

5 parts of the dyestuff of the formula

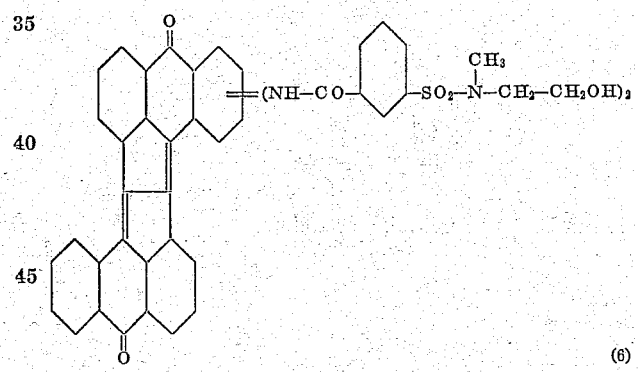

were added at 15–20° C. to 80 parts of sulfuric acid of 100 percent strength and stirred for one hour at room temperature. Working up was carried out as described in Example 1.

The new dyestuff of the formula

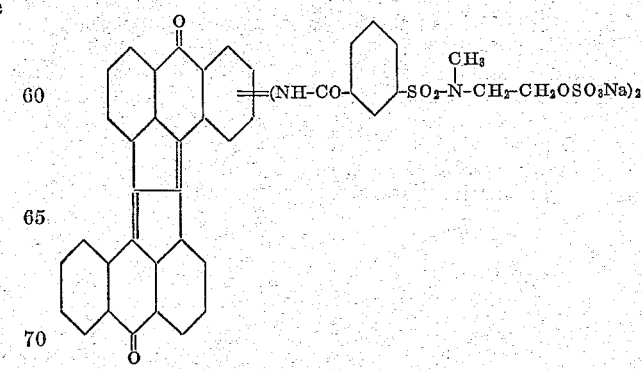

was completely water-soluble and gives a brown color. Brown shades were obtained with this dyestuff by the dyeing process described in Example 2.

What is claimed is:
1. A vat dyestuff of the formula

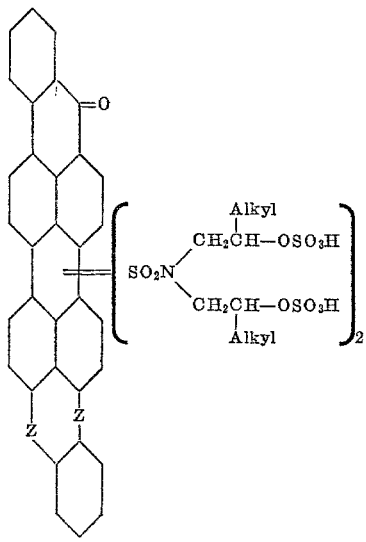

in which one Z represents a direct bond and the other Z a carbonyl group and "Alkyl" stands for a lower alkyl group.

2. The vat dyestuff of the formula

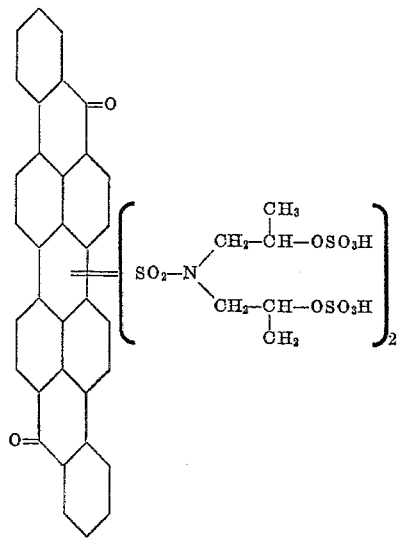

References Cited by the Examiner

UNITED STATES PATENTS

| | | | |
|---|---|---|---|
| 1,856,207 | 5/32 | Bruns et al. | 260—316 |
| 2,053,308 | 9/36 | Wuertz | 260—353 |
| 2,244,655 | 6/41 | Schlichenmaier et al. | 260—303 |
| 2,298,533 | 10/42 | Hentrich et al. | 260—249.5 |
| 2,335,698 | 11/43 | Rintelman | 260—303 |
| 2,368,451 | 1/45 | D'Alelio | 260—249.5 |
| 2,567,822 | 9/51 | Moergeli | 260—316 |
| 2,716,124 | 8/55 | Straley et al. | 260—353 |
| 2,735,849 | 2/56 | Ebel et al. | 260—249 |
| 2,749,352 | 6/56 | Schwechten et al. | 260—307.5 |
| 2,759,948 | 8/56 | Schwechten | 260—307.5 |
| 2,935,506 | 5/60 | Heslop et al. | 260—154 |
| 2,985,656 | 5/61 | Weber | 260—249 |
| 3,022,304 | 2/62 | Staeuble et al. | 260—249 |
| 3,029,123 | 4/62 | Putter et al. | 260—249 XR |
| 3,043,650 | 7/62 | Wegmann et al. | 8—54.2 |
| 3,066,005 | 11/62 | Wedemeyer et al. | 260—249 XR |

FOREIGN PATENTS

| | | |
|---|---|---|
| 733,471 | 7/55 | Great Britain. |
| 1,247,536 | 10/60 | France. |

LORRAINE A. WEINBERGER, *Acting Primary Examiner.*

IRVING MARCUS, DUVAL McCUTCHEN, JOHN D. RANDOLPH, LEON ZITVER, *Examiners.*

UNITED STATES PATENT OFFICE
CERTIFICATE OF CORRECTION

Patent No. 3,187,021                                                   June 1, 1965

Kurt Weber

It is hereby certified that error appears in the above numbered patent requiring correction and that the said Letters Patent should read as corrected below.

Column 9, lines 30 to 53, for that portion of the formula reading

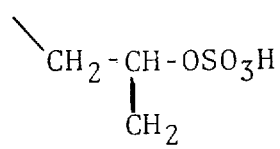      read      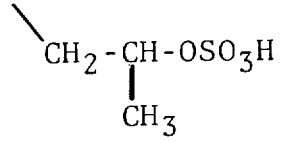

Signed and sealed this 15th day of March 1966.

(SEAL)
Attest:

ERNEST W. SWIDER                                       EDWARD J. BRENNER
Attesting Officer                                                       Commissioner of Patents